Aug. 10, 1965   R. E. LINDEMANN   3,199,865
SHEET DELIVERY MECHANISM
Filed April 12, 1962   9 Sheets-Sheet 1

FIG. 1

INVENTOR.
ROBERT E. LINDEMANN
BY Williams, David,
Hoffmann & Fount
ATTORNEYS

INVENTOR.
ROBERT E. LINDEMANN
BY Williams, David,
Hoffmann & Jourt.
ATTORNEYS

Aug. 10, 1965  R. E. LINDEMANN  3,199,865
SHEET DELIVERY MECHANISM
Filed April 12, 1962  9 Sheets-Sheet 6

INVENTOR.
ROBERT E. LINDEMANN
BY Williams, David,
Hoffmann & Jount
ATTORNEYS

United States Patent Office 3,199,865
Patented Aug. 10, 1965

3,199,865
SHEET DELIVERY MECHANISM
Robert E. Lindeman, Medina, Ohio, assignor to Harris-Intertype Corporation, Cleveland, Ohio, a corporation of Delaware
Filed Apr. 12, 1962, Ser. No. 186,993
19 Claims. (Cl. 271—64)

The present invention relates to a delivery mechanism in which a sheet may be selectively dropped or carried past a pile position and, more particularly, to such a delivery mechanism wherein the sheet is carried past the pile position for inspection purposes.

In certain types of delivery mechanisms in which the sheet being delivered can be selectively dropped at a pile position or carried past the pile position, problems are encountered in operating sheet guide means located at the pile position between different positions wherein the sheet is to be selectively dropped or carried by the pile position. Commonly, sheet guide means in the form of stripper fingers are located on the remote side of the pile with respect to the sheet as it is moved to the pile and the stripper fingers are moved from a position above the sheet path wherein the fingers are positioned when the sheet is to be dropped at the pile position to a position below the sheet path where they are positioned when the sheet is to be carried past the pile position. After a sheet has been carried past the pile position, the finger must be returned to its position above the path prior to the arrival of the following sheet if the latter is to be dropped at the pile position. If the tail of the preceding sheet which was carried past the pile position has not cleared the sheet guide fingers, there is danger that the stripper fingers will pierce the sheet when they are raised to their upper position for stripping sheets. This is particularly true in delivery mechanisms wherein the direction of movement of the conveyor is reversed immediately after the pile position so that a sheet being carried past the pile position is moving through a reversing section of the conveyor before the tail of the sheet clears the guide fingers. In the apparatus disclosed herein, when the maximum length sheet is being delivered, the tail edge of a sheet going past the delivery pile will overlap the leading edge of the following sheet, thus making it impossible for the fingers to move to their upper positions without piercing and tearing the first sheet.

An important object of the present invention is to provide a new and improved delivery mechanism in which a sheet being carried past a pile has the tail portion thereof advanced so that the tail clears the sheet guide means at an advanced time to minimize the possibility that the tail of the sheet might be pierced by the sheet guide means being operated to their pile delivery position.

Another object of the present invention is to provide a delivery mechanism in which a conveyor carries a sheet past a pile position for inspection and the sheet is moved outwardly of a reversing section of the conveyor immediately after the pile position to effect advancing of the tail of the sheet to minimize the danger that the tail of the sheet will be pierced by sheet guide means moving from a position in which the sheet is guided past a pile position to a pile delivery position wherein the following sheet is to be guided to the pile.

Still another object of the present invention is to provide a new and improved delivery mechanism in which air is directed against a sheet to cause the tail portion of the sheet to be moved to clear sheet guide means at a pile position past which the sheet is moving so that the tail portion clears the pile position and sheet guide means disposed over the pile position at an advanced time in the cycle of the delivery mechanism enabling the sheet guide means to be moved to a position for guiding the following sheet to the pile with little or no danger of piercing the tail of the sheet moving past the pile position.

A further object of the present invention is to provide a new and improved delivery mechanism in which a switch is operated as a sheet approaches a pile position to selectively move a sheet release cam and sheet guide means between a position for causing the sheet to move to the pile to respective positions for effecting a bypassing of the pile by the sheet and in which the operation of the switch by the following sheet approaching the pile position causes the return of the cam and sheet guide means to their positions for effecting a dropping of the following sheet at the pile position, and initiates operation of means for advancing the tail portion of the sheet bypassing the pile.

The present invention also contemplates the provision of a new and improved delivery mechanism wherein a cam which is moved to cause a sheet being delivered to bypass a pile position is supported for swinging movement about an axis extending parallel to the path of sheet movement past the pile position and is swung about the axis when moved to its inactive position for causing a sheet to bypass the pile position, the cam preferably being supported for longitudinal movement along the axis to adjust the cam for various types of sheets being delivered.

A still further object of the present invention is the provision of a new and improved delivery mechanism for delivering sheets to a pile or past the pile and wherein stripper fingers for guiding a sheet to the pile are supported on a rockshaft which is movable between positions for guiding the sheets being delivered to the pile and a position wherein the sheets being delivered are guided past the pile, the rockshaft being connected to move a cam for releasing the sheets at the pile position between active and inactive positions upon the rocking of the shaft.

Further objects of the present invention will be apparent from the following detailed description of the preferred embodiment thereof made with reference to the accompanying drawings forming a part of this specification, and in which.

Figure 1:
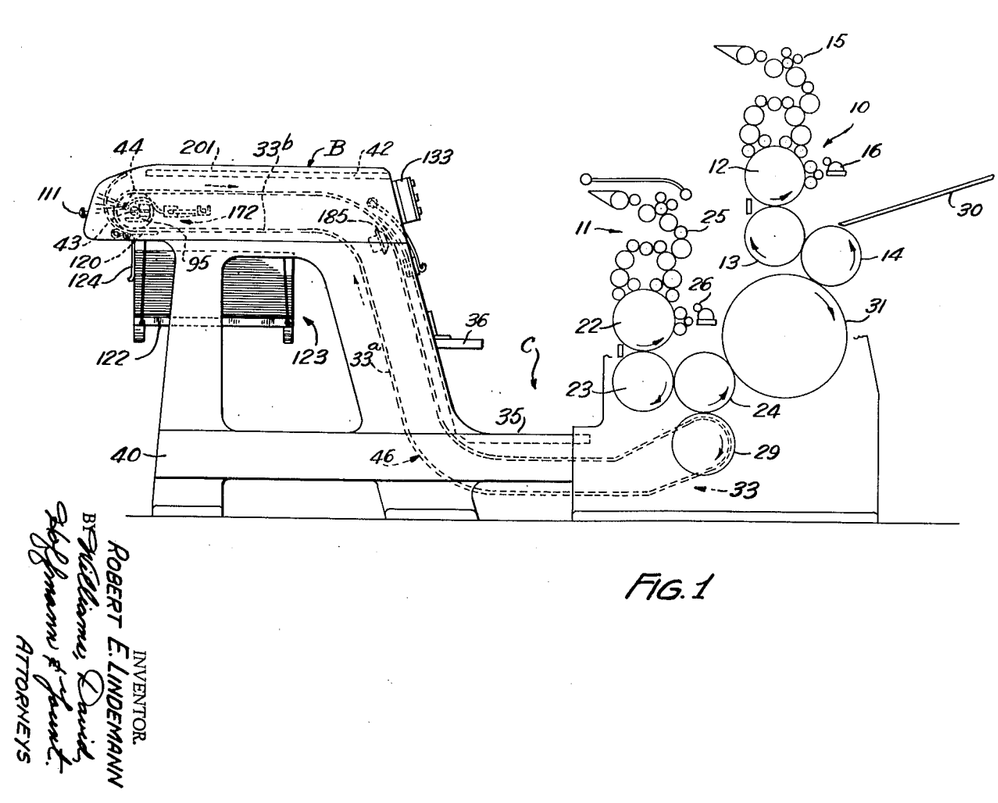
FIG. 1 is a diagrammatic side elevational view of a printing press delivery mechanism embodying the present invention.

The present invention is embodied in a press and delivery mechanism shown in FIG. 1. The press is a multicolor printing press having first and second printing units 10 and 11, respectively, and a delivery mechanism B which receives the printed sheets from the press, the sheets being designated S in the drawings, and stacks the sheets onto a delivery elevator 123.

The printing units are preferably conventional, rotary, offset, lithographic sheet-printing units. The printing unit 10 is shown as comprising a plate cylinder 12, a blanket cylinder 13, and an impression cylinder 14. An inker 15 is located above the plate cylinder 12 and a dampener 16 is located to the right of the plate cylinder 12, as viewed in FIG. 1, to act on the plate cylinder 12 in advance of the inker. Printing unit 11 is shown as comprising a plate cylinder 22, a blanket cylinder 23, and an impression cylinder 24. An inker 25 is located above the plate cylinder 22 and a dampener 26 is located to the right, as viewed in FIG. 1, of the inker 25 to act on the plate cylinder in advance of the inker.

The sheets to be printed by the printing units are fed down a feedboard 30 to the impression cylinder 14 of the printing unit 10. The impression cylinder carries the sheets through the first printing station at the print line between the blanket and impression cylinders 13, 14. A double-size transfer cylinder 31 receives the sheets from the impression cylinder 14 after they pass through the first printing station and transfers them to the impression cylinder 24 of the printing unit 11. A double-size transfer cylinder is one having twice the diameter of the impression cylinders of the press. The impression cylinder 24 carries the sheets through a second printing station at the printline of the blanket cylinder 23 and the printed sheets are then taken by a delivery conveyor 33 which passes around a sheet delivery drum 29 disposed adjacent the impression cylinder 24.

The conveyor 33 comprises a plurality of spaced gripper assemblies 34 supported between endless chains 46, 47 having upper and lower runs defining the delivery and return runs of the conveyor. The conveyor 33 passes around the sheet delivery drum 29 and extends from the sheet delivery drum 29 under a work platform 35 defining an operator's station C, rises vertically after passing under the platform 35 to provide a generally vertical portion 33a and then extends horizontally through a horizontal portion 33b over the pile elevator 123. The lower runs of the endless chains 46, 47 define the delivery run of the conveyor and the sheets taken from the impression cylinder 24 are moved along the lower runs of the chains 46, 47 to a position over the pile elevator 123 where they are released and allowed to drop onto the pile elevator. The upper runs of the chains 46, 47 provide the return run of the conveyor for returning the gripper assemblies. The gripper assemblies 34 are spaced from each other along the chains 46, 47 a distance which is related to the circumference of cylinder 24 so that the gripper assemblies will be successively moved into position to take successive sheets from the impression cylinder 24.

The platform 35 is at about approximately the same level as the sheet delivery drum 29 and is disposed below the level of the cylinders of the printing unit 11. The platform 35 forms a work station for the pressman and the pressman may, from the work station, make press adjustments, such as adjustments of the inkers 11 and 15. In the press illustrated, the printing unit 10 is at a higher vertical elevation than the printing unit 11 so that the plate cylinder and the inker of the printing unit 10 are above the level of the inker of the printing unit 11. The printing units are disposed close together and, in the illustrated press, it is possible for a pressman at the operator's station C to make adjustments to both the printing unit 10 and the printing unit 11 from the station C. A hinged step 36 extending across the press may be provided above the platform 35, as is shown in FIG. 1. As is shown therein, the hinged step 36 is supported by the frame structure of the delivery mechanism and may be swung vertically upwardly to an inactive, out of-the-way position.

The delivery mechanism B has a frame including two vertically extending side frame members 40 and 41 which support an upper frame member 42 extending therebetween. The chains 46, 47 are adjacent the side members 40, 41, respectively, and pass around pulley members 44, 45, respectively, journaled on a rod 43, the member 44 being located adjacent side frame member 40, and member 45 being located adjacent side frame member 41. The chains 46, 47 are also guided by pulley member 45 and by other pulleys, not shown, for guiding the chains 46 and 47 through their paths. The pulleys 44, 45 reverse the direction of movement of the chains 46, 47 and this part of the chain conveyor may be termed a reversing section which joins the delivery run and the return run of the conveyor 33.

Figures 4, 8:
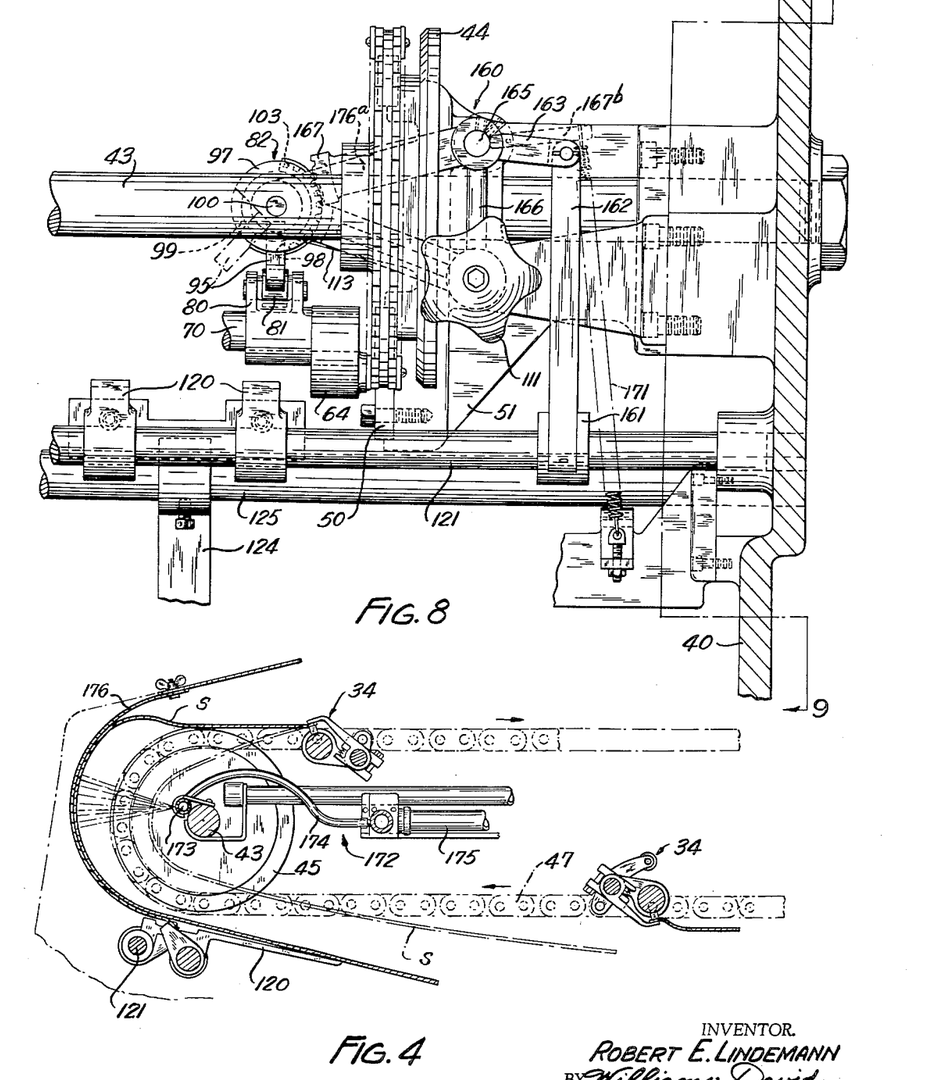
FIG. 4 is a partial sectional view, similar to FIG. 2, illustrating the position of a sheet after the air blast has moved the sheet.
FIG. 8 is a partial end view with parts omitted of the delivery mechanism of FIG. 1 looking at the delivery mechanism from the left.

The chains 46, 47 are driven through their endless path by drive sprockets, not shown, on the ends of the sheet delivery drum 29. Suitable tracks or guides comprising bar members 50 are provided, where necessary, for guiding the movement of chains 46, 47. The bar members 50 are positioned to engage top and bottom surfaces of the chains and are supported by suitable supporting structures 51 which are suitably secured to the side frames 40, 41. Referring to FIG. 8, by way of example, the lower bar member 50 for chain 46 is there shown bolted to the supporting structure 51.

The gripper assemblies 34, as stated earlier, are supported by chains 46, 47 and are spaced apart along the chains a distance which is related to the circumference of the impression cylinder 24. Each sheet gripper assembly 34 is adapted to receive the leading edge of a sheet on the impression cylinder of printing unit 11 in a conventional manner and to grip the sheet to cause it to move with the assembly. The construction and operation of all of the sheet gripper assemblies 34 are identical and only one of the gripper assemblies will be described, but on the drawings the same reference numerals are used to designate corresponding parts of all of the sheet gripper assemblies.

Each sheet gripper assembly 34 includes a gripper bar 61 which extends between the chains 46, 47 and which has spaced gripper posts 61a thereon. A plurality of gripper fingers 62 corresponding in number and spacing to the gripper posts are along the bar and are mounted on a rod 70. The fingers 62 are rotatable on the rod 70 and are biased into engagement with abutments 62a fixed to the rod by individual springs 63. The rod 70 is rotatable to move the fingers 62 into engagement with the posts 61a to clamp and grip a sheet therebetween.

Figure 2:
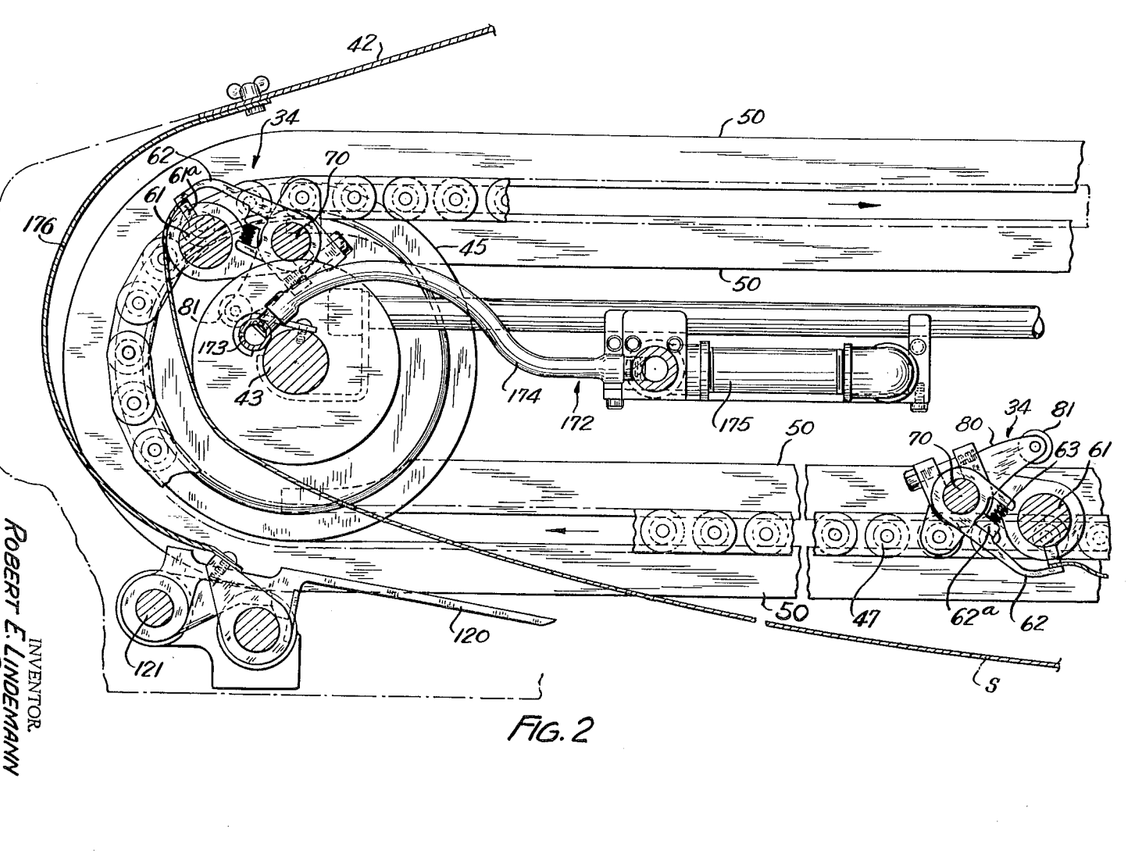
FIG. 2 is a sectional view taken approximately on section line 2—2 of FIG. 5 and illustrating the position of a sheet before the air blast is effective to move the sheet.
Figure 3:
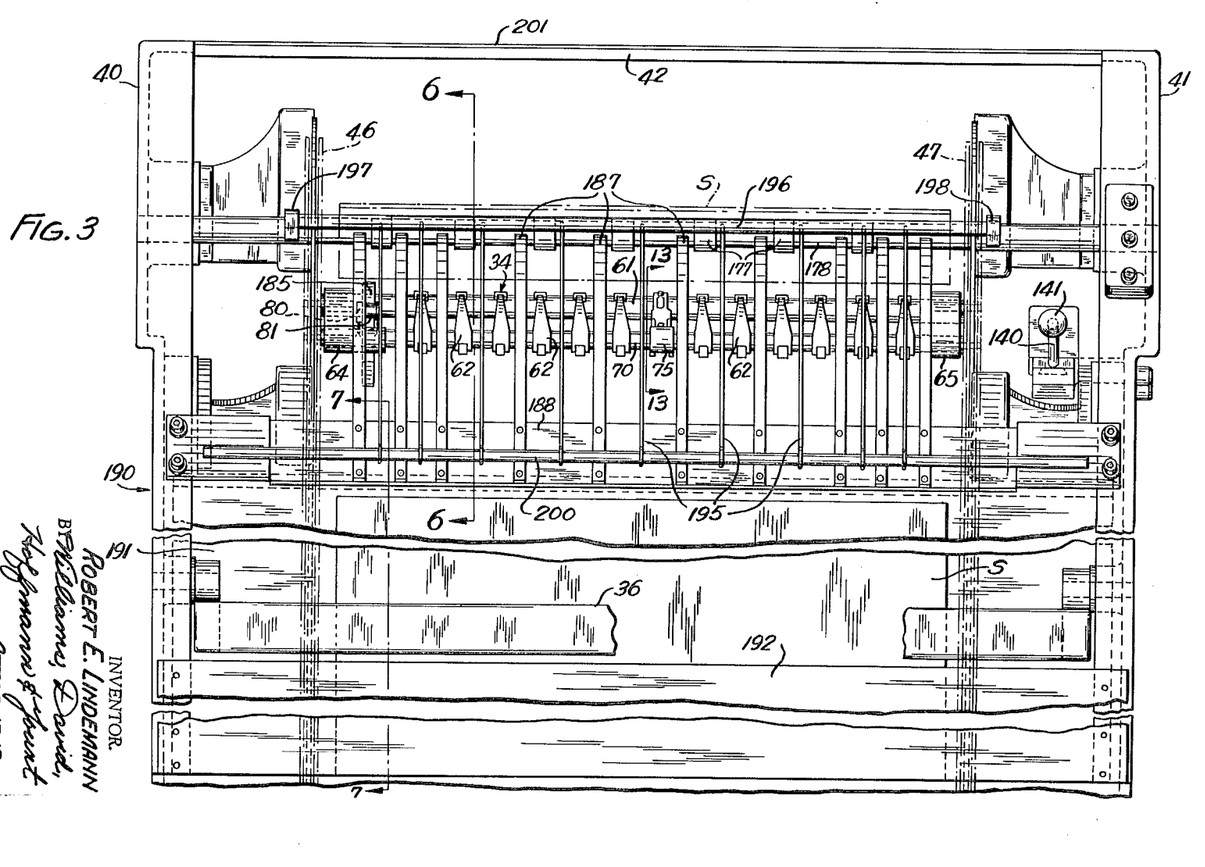
FIG. 3 is a partial end elevational view of the delivery mechanism of FIG. 1 looking at the delivery mechanism from the right.

The rod 70 is biased in a counterclockwise direction, as viewed in FIG. 2 to urge the fingers into gripping position by a conventional tension spring mechanism 75. When the fingers 62 engage the sheet, the springs 63 will give on continued rotation of the rod 70. The tension spring mechanism 75 includes a coil spring 76 supported at one end by gripper bar 61 and at the other end by rod 70 to bias the rod to move the gripper fingers 62 into gripping position in a conventional manner. Upon rotation of rod 70 in a clockwise direction as viewed in FIG. 2, the gripper fingers 62 will be moved about the axis of rod 70 against the bias of spring 76 to release the sheet held thereby. A bifurcated arm 80 is fixedly secured to shaft 70 on the end thereof adjacent side frame 40 and supports a roller 81 which is adapted to be moved downwardly by a trip cam 95 which rotates shaft 70 in a clockwise direction and causes the gripper fingers 62 to rock and release the sheet held thereby.

Figures 5, 13:
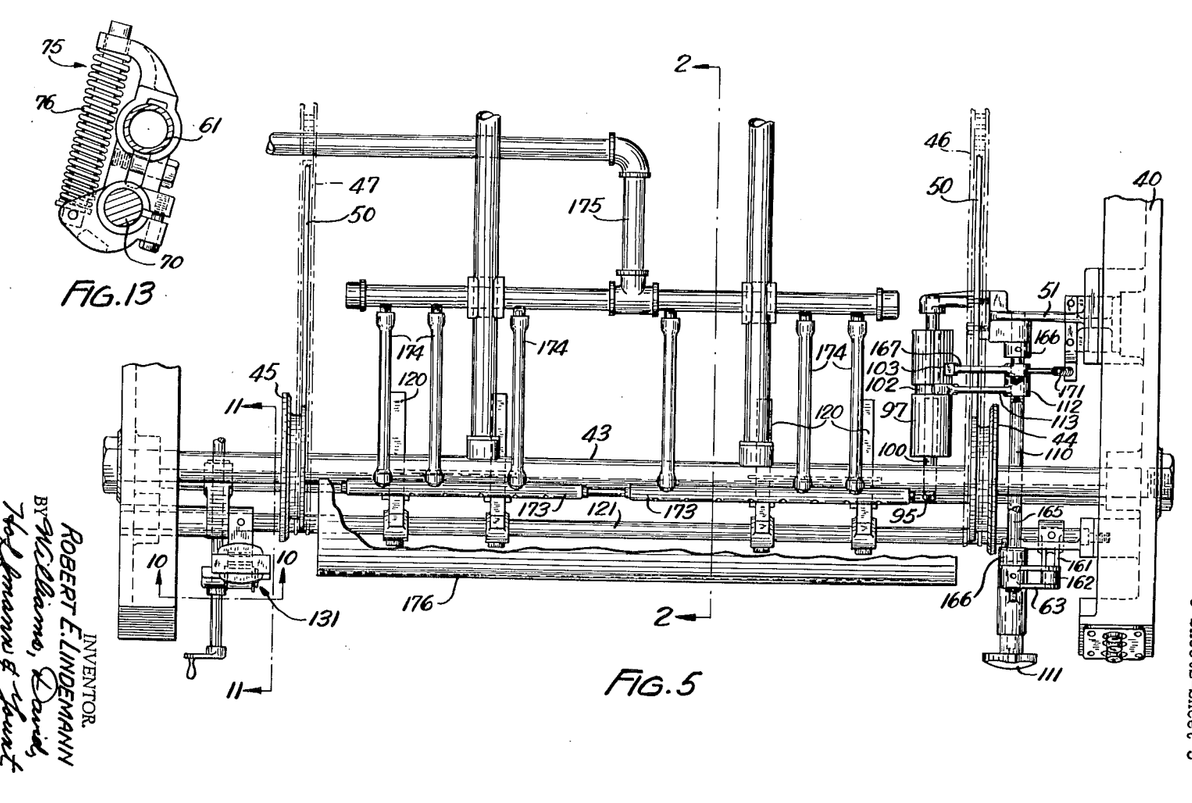
FIG. 5 is a partial top view of the delivery mechanism shown in FIG. 1 with parts omitted.
FIG. 13 is a partial sectional view taken approximately on section line 13—13 of FIG. 3.

The trip cam 95 has a cam surface 96 which moves roller 81 downwardly to release the gripper assemblies and is located between the delivery and return runs of chains 46, 47 adjacent the left end thereof as viewed in FIG. 1 at a release point D. The trip cam 95 depends from a generally cylindrical member 97. The support member 97 is rototably and slidably mounted on a rod 100, one end of which is fixedly supported in a support member 51 and the other end is supported by the rod 43 which has a passageway in which the rod 100 is inserted. The member 97 is provided with a peripheral groove 102 intermediate its ends and gear teeth 103 located on the cylindrical surface thereof on one side of the groove 102. Specifically, the gear teeth 103 are located on the portion of member 97 which lies above groove 102 as viewed in FIG. 5. The trip cam 95 is normally held, as will be described hereinbelow, in a position wherein it is located in the path of movement of the rollers 81 of the gripper assemblies to cause cam surface 96 to move the rollers 81 downwardly as the rollers pass the trip cam 95 to release the sheets held by the gripper assemblies. The cam surface 96 will normally engage the roller 81 of each gripper assembly as the gripper assembly passes thereby to release the sheet held thereby.

Figure 9:
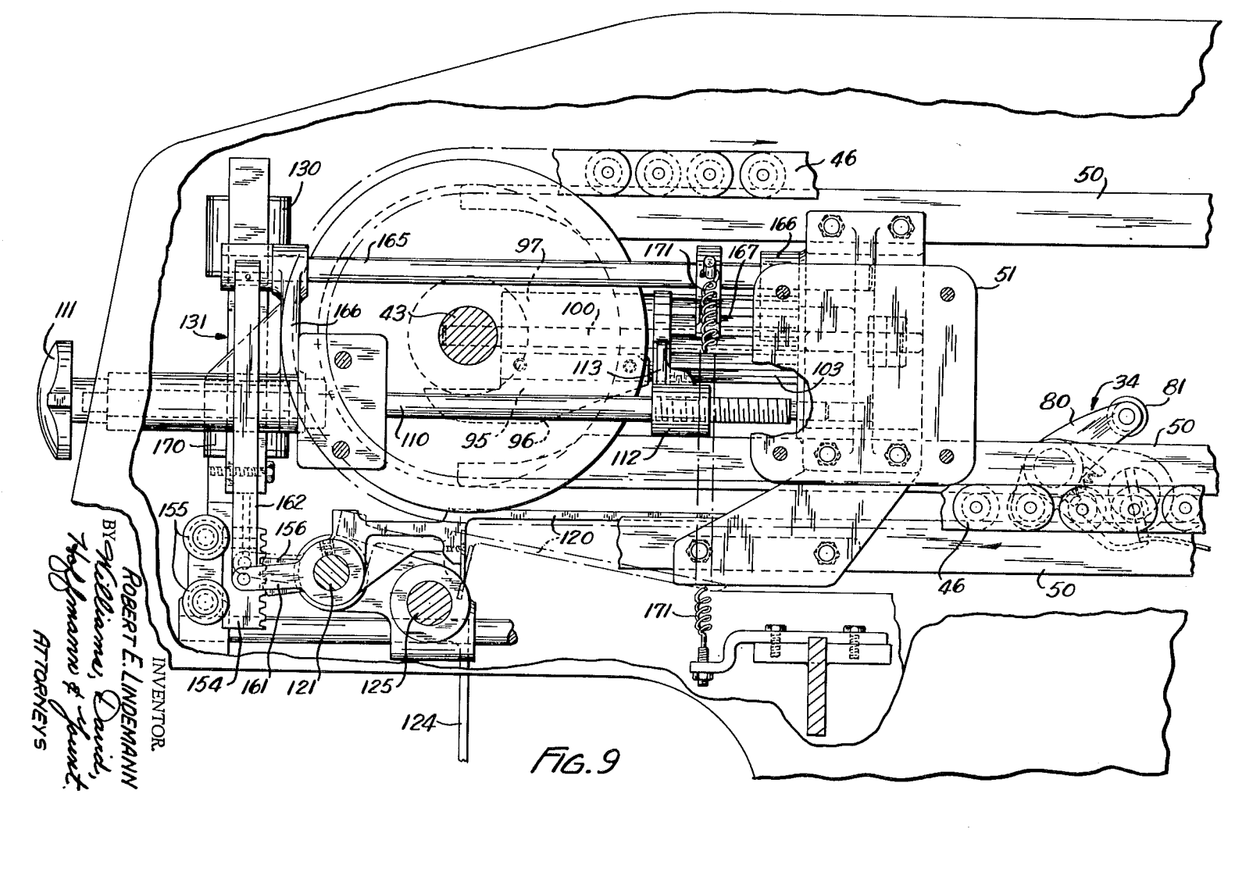
FIG. 9 is a sectional view taken approximately on the section line 9—9 of FIG. 8.
Figure 10:
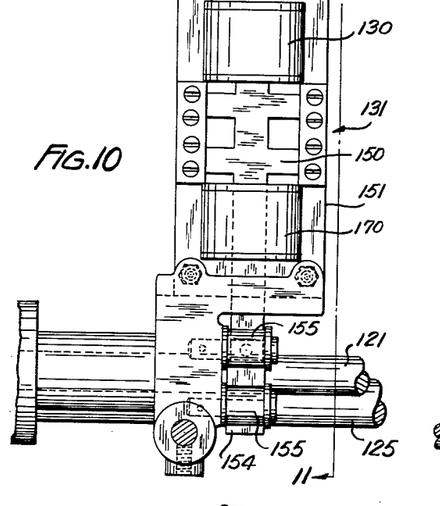
FIG. 10 is a sectional view with parts omitted of the delivery mechanism shown in FIG. 1 taken approximately on section line 10—10 of FIG. 5.

The member 97 is slidable along the rod 100, on which the member 97 is mounted, so that the location of the cam surface 96 can be varied to cause the sheets to be released by the gripper assemblies 34 at different points along the path of movement of the chains 46 and 47. The member 97 is slid along the rod 100 in response to rotation of shaft 110 which extends parallel to side frame member 40 and is rotatably supported by suitable support members secured to the side frame 40. The right end of shaft 110, as viewed in FIG. 9, is threaded, while the left end projects slightly beyond the end frame member 40 and carries a knob 111 which serves as a means for rotating the shaft 110. The threaded end of the rod has a sleeve 112 threaded thereon and one end of a suitable yoke member 113 is cast integral with the sleeve 112 and projects therefrom in a direction perpendicular to shaft 110. The other end of member 113 is positioned in groove 102, formed in the member 97. Rotation of the knob 111 causes the shaft 110 to rotate and the sleeve 112 is moved along the shaft, thus causing the yoke member 113 to slide the support member 97 along shaft 100, thereby adjusting the position of the trip cam 95 relative to the chains 46 and 47.

A plurality of stripper fingers 120 are positioned at release point D slightly below the level of the lower run of chains 46, 47 and are spaced transverse to the direction of movement of the chains adjacent the trip member 95. In the "up" position, as shown in FIG. 9, the finger tips are above the incoming sheets, but below the bar 61. The stripper fingers are fixedly mounted on shaft 121 which is rotatably supported at its opposite ends by the side frame members 40, 41 for a purpose to be described hereinbelow. The stripper fingers 120 normally are positioned as shown in full lines in FIG. 9, and when in this position, extend over the upper surface of a sheet being advanced to strip and guide the sheet from the gripper assembly 34 upon release thereof to cause the sheet to drop onto a pile support 122 of the delivery elevator 123 and the pile support is lowered as the sheets are dropped thereon in a conventional manner to maintain the top of the pile at approximately the same height.

As a sheet drops onto the pile support 122 the leading edge thereof engages end gate fingers 124 which normally extend vertically downwardly from shaft 125 on which they are mounted. The end gate fingers function to guide the sheet into position on the pile support 122, thereby forming a pile of aligned sheets. The opposite ends of shaft 125 are rotatably mounted in the side frame housings 40, 41 and may be rotated by a conventional crank mechanism, not shown, to rotate the end gate fingers clockwise, as viewed in FIG. 1, into substantially a horizontal position to facilitate removal of a sheet from the pile support 122 if the operator is at this end of the press.

When the operator of the press desires to inspect a printed sheet to determine the quality of the printing and whether or not adjustment of the printing units 10 and 11 is necessary, the delivery mechanism B may be operated to deliver a sheet to the operator at the operator's station C so that the operator need not leave the operator's station and take a sheet from the pile on the pile support 122 for inspection thereof.

In order for the delivery unit B to deliver a printed sheet to the operator's station C, the trip cam 95 is moved out of the path of movement of roller 81 on the gripper assembly approaching release point D and the stripper fingers 120 are lowered out of the path of movement of the sheet carried thereby, thus permitting the chains 46, 47 to carry the sheet beyond release point D along the aforementioned reversing run at the left end of the delivery mechanism as viewed in FIG. 1, and along the return run of the chains 46, 47. The operator can cause the trip cam 95 to be moved out of the path of movement of the roller 81 by energizing a solenoid coil 130 of a double-acting solenoid 131 suported in any suitable manner adjacent the side frame member 41 near the left end thereof as viewed in FIG. 5. The solenoid coil 130 can be energized by the operator from the operator's station C by depressing a switch 132 on a control panel 133 located at the operator's station.

Figure 12:
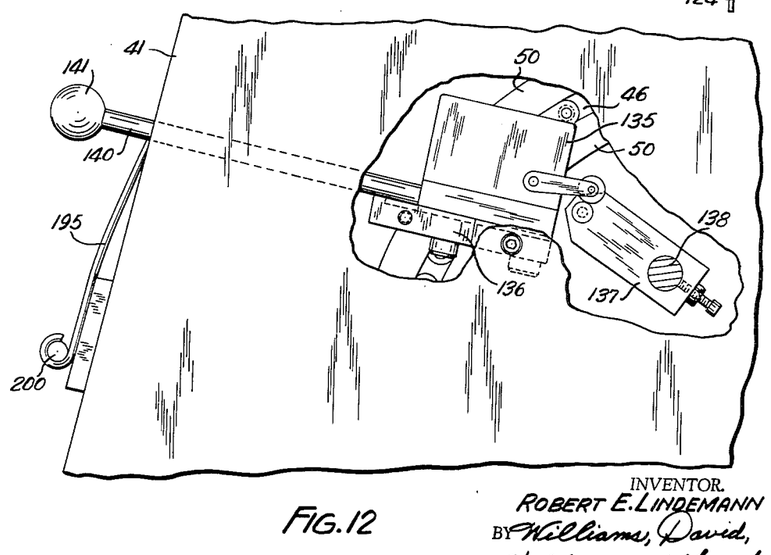
FIG. 12 is a partial side view of the delivery mechanism shown in FIG. 3 looking at the delivery mechanism of FIG. 3 from the right and having the side frame member broken away.

Actuation of the switch 132 on the control panel 133 causes energization of the solenoid coil 130 when a switch 135 is actuated. The circuit involved will be described in detail hereinbelow. The switch 135 is actuated at a predetermined point in the cycle of operation of the apparatus by an actuating member 137 fixedly secured to a shaft 138 which is oscillated in timed relation to the drive to the chains 46, 47 and thus the coil 130 is energized when the chains 46, 47 are at a predetermined point in their path of movement, namely, when a gripper assembly 34 supported by the chains 46, 47 is approaching trip cam 95. As shown in FIG. 12, the switch 135 is fixed to a slide member 136 and has a rod 140 secured thereto. The rod 140 has a knob 141 which the operator may grip to pull rod 140 to the left, as viewed in FIG. 12, to slide the switch 135 out of the path of movement of actuating member 137. Of couse, if the switch is moved, the coil 130 of the solenoid 131 cannot be actuated, as will be apparent from the detailed description of the electrical circuit hereinbelow.

Figure 11:
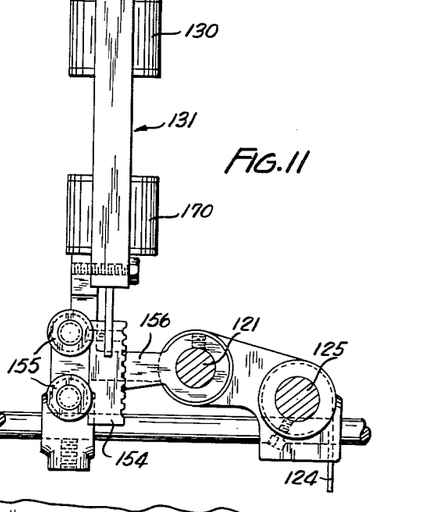
FIG. 11 is a sectional view with parts omitted of the delivery mechanism shown in FIG. 5 taken approximately on section line 11—11 of FIGS. 5 and 10.

Energization of coil 130 of solenoid 131 causes the armature 150 of the solenoid to move vertically upward relative to the frame 151 of the solenoid. A rack 154 is connected to the portion of the armature 150 which extends below the frame 151. When the armature 150 moves upwardly, the rack 154 moves upwardly as well. The upward movement of the rack 154 is guided by a pair of rollers 155 suitably mounted adjacent the rack to engage one side thereof. The rack 154 meshes with a sector gear 156 which is fixedly secured to the shaft 121 on which the stripper fingers 120 are fixedly supported. The upward movement of the rack 154 and the sector gear 156 will cause the shaft 121 to rotate in a clockwise direction as viewed in FIG. 11 and cause the stripper fingers 120 to pivot downwardly to the dotted position shown in FIG. 9. In this position, the stripper fingers are below the path of movement of the sheet, and thus the sheet can move past the stripper fingers.

Rotation of the shaft 121 also actuates a mechanism, generally designated 160, for swinging trip cam 95 out of the path of movement of the roller 81 of the oncoming gripper assembly 34 to an inactive position. The mechanism 160 includes a link 161 fixedly secured to the shaft 121 adjacent the end of the shaft 121 which is supported by the side frame member 40 and extending in a direction parallel to side frame member 40. The lower end of a vertically extending link 162 is secured to the link 161 at a point remote from where link 161 is secured to shaft 121. One end of a horizontally extending bifurcated link member 163 which extends in a direction parallel to the extension of shaft 121 is pivotally connected to the upper end of link 162. The other end of link member 163 is fixedly secured to a horizontally extending shaft 165, which shaft extends parallel to the side frame member 40, and is rotatably supported at its opposite ends by support members 166 which are suitably secured to the side frame 40. A sector gear 167 is fixedly secured to shaft 165 and meshes with the gear teeth 103 formed on member 97.

The sector gear 167 is formed on the end of a rocker arm 167a fixed to shaft 165 for rocking movement thereby so that the rocking of the arm 167a oscillates the member 97 and cam 95 between their active and inactive positions. The rocker arm has an extension 167b on the side of shaft 165 opposite to the gear 167 to which a counterbalancing spring 171 is connected. The tension of the counterbalancing spring is increased by movement of the arm 167a to move the cam 95 to its inactive position.

When the solenoid 130 is energized, the shaft 121 will rotate in a clockwise direction, as viewed in FIG. 9, to its position where fingers 120 are lowered; the sector gear 167 will swing in a counterclockwise direction, as viewed in FIG. 8; and the trip cam 95 will rotate in a clockwise direction about rod 100 to the dot-dash position shown in FIG. 8. When the trip cam 95 is located in the dot-dash position shown in FIG. 8, it will not engage the roller 81 which releases the gripper assembly 34 from engagement with the sheet being fed. Thus, the sheet rather than being dropped onto the pile support 122 will be conveyed around the afore-mentioned reversing section and along the return run of the conveyor.

As the sheet is conveyed around the reversing section of the conveyor, the sheet is free to move inwardly of the conveyor chains, as shown in FIG. 4, toward the shaft 43. This movement causes the tail of the sheet to lag behind the conveyor chain and the following sheet will, in certain instances, move over the tail of the sheet moving through the reversing section, as is illustrated in FIG. 4. When this overlap occurs, the release cam and stripper fingers cannot be moved to their positions for effecting a dropping of the sheet approaching the pile without piercing the sheet moving through the reversing section of the conveyor.

In the preferred and illustrated embodiment, the sheet moving around the pulleys 44, 45 has the tail thereof advanced to clear the fingers 120, at an advanced time, by sheet advancing means which, in the illustrated embodiment comprises an air blast. The advancing of the tail of the sheet moving through the reversing section enables the fingers to be raised and the cam 95 moved to its active position so that the following sheet can be dropped at the pile position.

The air blast is directed against the sheet by a suitable air supply mechanism 172. The air supply mechanism 172, in the preferred and illustrated embodiment, comprises a plurality of air nozzles 173 suitably supported by the rod 43 and spaced therealong to direct air outwardly from the left end of the delivery mechanism B as viewed in FIG. 1. Each air nozzle 173 is connected by suitable supply conduits or hoses 174 to a main supply conduit or pipe 175 which is connected to a suitable air supply.

The air blast preferably is timed to come on after the sheet moving past the pile position has moved into the reversing section of the delivery conveyor and the leading edge of the sheet is above the air blast nozzle 173.

When the air blast comes on, it is directed against the inner side of the sheet by the air blast nozzles to move the sheet outwardly away from the reversing section against a guard 176. The air blast remains on for a predetermined portion of the cycle, as will be explained hereinafter. The turning on and off of the air blast and the operation of the trip cam 95 and fingers 120 are controlled by the operation of the switch 135 after the pressman has conditioned the switch by operating pushbutton switch 132. The particular manner in which the switch 135 controls the air blast, the trip cam and the fingers 120 is described in detail hereinafter.

Figure 6:
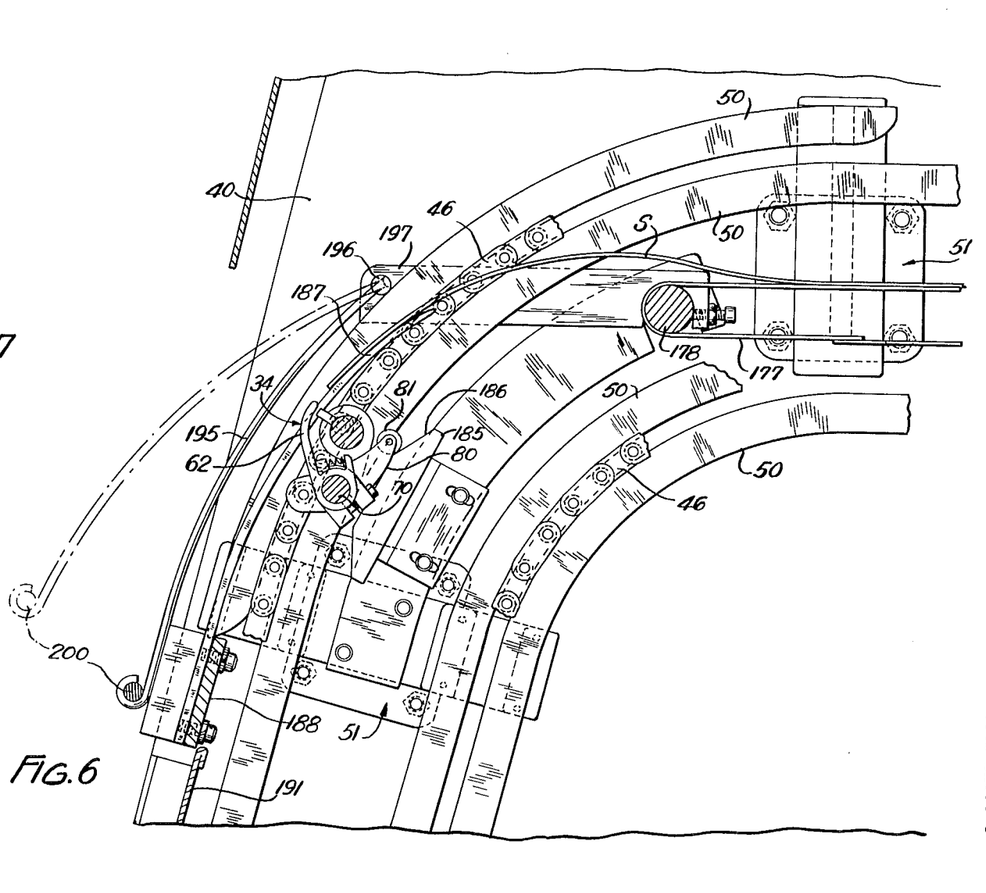
FIG. 6 is a sectional view taken approximately on the section line 6—6 of FIG. 3.

As the sheet is conveyed along the return run of the chains 46, 67, it starts down the vertical portion of the conveyor and the trailing end of a sheet tends to drape downwardly, as shown in FIG. 6. A plurality of cloth tapes 177 are suitably supported between the delivery run and return run of the chains 46 and 47 and spaced transverse to the direction of movement of the chains 46 and 47 to support the draped sheet and prevent the sheet from interfering with the delivery run of the chains 46 and 47. The tapes 177 are in the form of a loop and are trained around a bar 178 located, as shown in FIG. 6, at the top of the aforementioned vertical portion 33a of the chains 46, 47 and supported at its opposite ends by side frame members 40, 41. The other ends of the tapes 177 are trained around a pipe, not shown, suitably supported at its opposite ends by the side frames 40 and 41.

As the gripper bar assemblies 34 carry sheets along the return run of the chains 46 and 47 and as the gripper bar assemblies 34 begin to move downwardly on the aforementioned vertical section of the return run of the conveyor chains the rollers 81 of the gripper assemblies 34 engage a trip cam 185 suitably supported by side frame member 40. The trip cam 185 has a cam surface 186 which when the rollers are engaged thereby causes the rollers to pivot in a direction toward the gripper bars 61, namely, in a counterclockwise direction, as viewed in FIG. 6. This causes the gripper assemblies to release the sheet which is being conveyed.

The sheets released by the gripper assemblies 34 are stripped therefrom by a plurality of stripper fingers 187. The stripper fingers 187 extend vertically and are spaced transverse to the direction of movement of the chains 46, 47. The lower end of each stripper finger 187 is suitably secured to a plate 188 located below trip cam 185, and which extends between and is supported by the side frames 40, 41. The upper end of each stripper finger 187 is located above the trip 185 and in position to engage the underside of the sheet being conveyed to guide the sheet outwardly from the gripper assemblies 34 when the latter are released.

Figure 7:
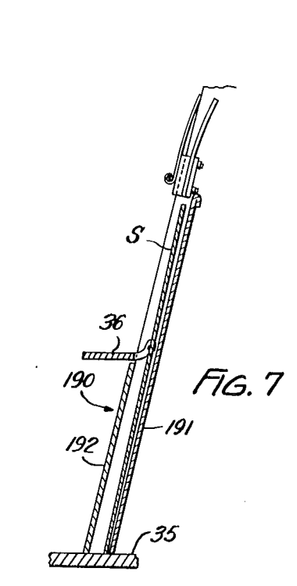
FIG. 7 is a sectional view taken approximately on the section line 7—7 of FIG. 3.

The lower ends of the stripper fingers 187 are located above a receptacle-like structure 190 which receives a sheet released by trip cam 185. The structure 190 is formed by two plates 191, 192 extending along the side of the operator's station adjacent the delivery mechanism. The plate 191 extends between the side frame members 40, 41 and the opposite ends thereof are secured to the innerside of the side frame members. The plate 192 extends parallel to plate 191 and is secured at its opposite ends to the outer edge of the side frame members 40, 41. The plate 192, as shown in FIG. 7, does not extend vertically as far as does the plate 191, for a purpose to be described hereinbelow. The bottom of the receptacle-like structure 190 is formed by platform 35 which extends under the structure 190.

As a sheet moves toward the receptacle-like structure 190 after its release, it is also guided by means of a cage comprising a plurality of guide fingers 195 which extend vertically and are spaced outwardly from the stripper fingers 187, as viewed in FIG. 6. The fingers 195 and fingers 187 actually form a guide channel through which the sheet moves. The topmost ends of the guide fingers 195 are secured to a rod 196 which is rotatably supported at its opposite ends in bar members 197 and 198, which in turn are fixedly secured to bar 178. The opposite sides of rod 196 rest on the bar members 50 of the guides or tracks for chains 46, 47. The lower ends of the guide fingers 195 are secured to a bar 200 which extends transversely of the direction of movement of the chains 46, 47 and which may be gripped by the operator and raised to pivot the guide fingers 195 about the axis of the rod 196 to provide access to and facilitate removal of a long sheet from the receptacle 190. Since the plate 191 does not extend vertically as far as plate 192, the sheet in the receptacle 190 is easily available to the operator.

When a sheet is removed from the receptacle 190 by the operator, it is placed on a suitable inspection table 201, which is provided by the top frame member 42 of the delivery mechanism B. When the sheet is positioned on the inspection table 201, the operator standing at the operator's station can inspect the sheet carefully to determine what adjustments should be made in the printing units. The operator may then make these adjustments while standing at the operator's station.

Figure 14:
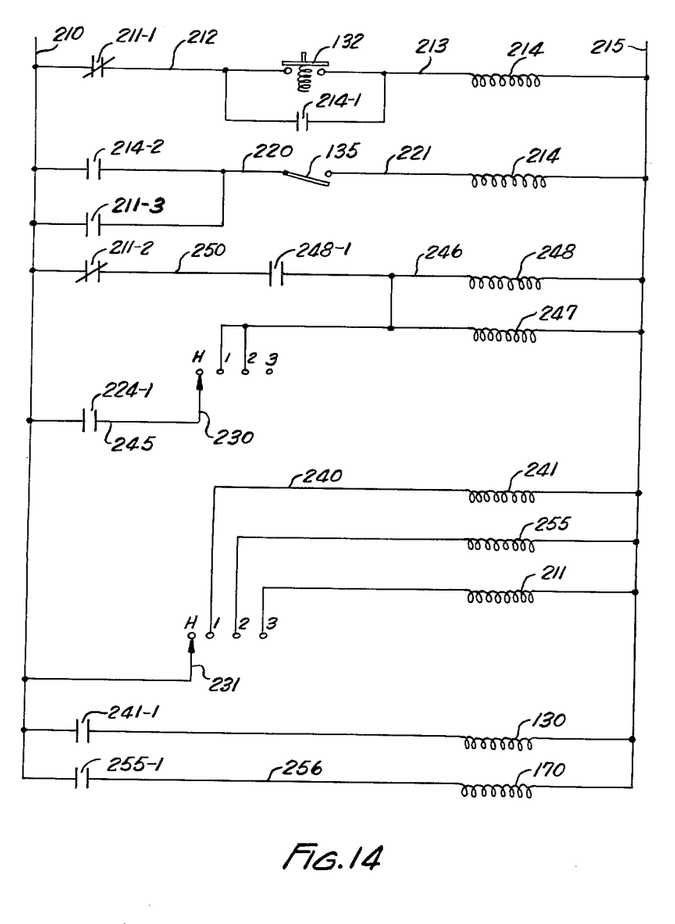
FIG. 14 is a schematic view of a portion of the electrical circuitry used in the apparatus of FIG. 1.

As hereinbefore mentioned, the operator may, without leaving the operator's station C, inspect a printed sheet at the station C by depressing switch 132, to close the contacts thereof. The closing of the contacts of switch 132 causes a circuit to be completed from power line 210 through normally closed contacts 211-1 of a relay 211, a conductor 212, now closed contacts of switch 132, a conductor 213, and a relay coil 214 to power line 215. Energization of the relay coil 214 causes normally open contacts 214-1 and 214-2 thereof to close. Closing of the contacts 214-1 causes a holding circuit to be established around the switch 132 which maintains the solenoid coil 214 energized even though the operator releases switch 132.

The contacts 214-2 of relay coil 214 are in a circuit with switch 135 which is closed by the actuating member 137 at a predetermined point in the cycle of the delivery mechanism when a sheet is approaching the pile position. The first closing of switch 135 after the contacts 214-2 are closed causes the stripper fingers 120 to drop and the cam 95 to move to its inactive position. When the switch 135 is first closed after the making of contacts 214-2, a circuit is completed from the power line 210 through now closed contacts 214-2 of the relay 214, a conductor 220, now closed contacts of the switch 135, a conductor 221, and a stepping relay 224 to power line 210.

The stepping relay 224 is of a conventional type having two contact arms or sliders 230, 231 which are moved to successive positions each time the relay is energized and de-energized and which engage a respective contact at each position. The contacts for each slider are designated in the same manner with H indicating the home or normal position of the sliders, and the positions to which the sliders are stepped in sequence to cause a sheet to be delivered to the operator's station are numbered 1, 2, 3, indicating the first, second and third positions to which the sliders are successively moved. Energization of the relay coil 224 causes the relay to be "cocked" and when de-energized, the sliders 230, 231 step to their next position. In addition to the slider contacts, the relay 224 has normally open contacts 224-1 which close when the relay 224 is "cocked." The contacts 224-1 are in series with the slider 230 which, when in its home position, is in engagement with contact H which has no electrical connection thereto.

The switch 135 is only momentarily closed by the actuating member 137 and when the switch 135 opens, the circuit to the stepping relay 224 is broken and the stepping relay is de-energized causing the sliders 230, 231 to move from their H contacts to engage their respective No. 1 contacts. Movement of the slider 230 into engagement with its No. 1 contact performs no function at this time since normally open contacts 244-1 of relay 224 are open upon de-energization of relay 224, thereby breaking the circuit which includes slider 230.

Movement of slider 231 into engagement with its No. 1 contact effects the moving of the trip cam 95 to its inactive position and the lowering of the fingers 120. This engagement of slider 231 with its No. 1 contact completes a circuit from power line 210 through slider 231, conductor 240 and relay coil 241. Energization of relay coil 241 causes its contacts 241-1 thereof to close and energize solenoid 130 to operate trip cam 95 so that it is swung out of the path of movement of roller 81 of the gripper assembly approaching the trip cam 95 and to lower the stripper fingers 120, so that the sheet approaching the pile position will move past the pile position rather than being dropped onto the pile elevator support 122.

As the next or first succeeding sheet after the sheet to be inspected approaches the trip cam 95, the switch 135 will again be closed by actuating member 137. Closing of switch 135 completes a circuit through the stepping relay 224 which causes the stepping relay to be energized. Energization of the stepping relay 224 causes the relay to become "cocked" and causes normally open contacts 224-1 thereof to close. Closing of the contacts 224-1 of stepping relay 224 with the slider in engagement with the No. 1 contact causes the energization of relay coils 247, 248. The relay coil 247 is an air blast relay and the energization thereof actuates the air blast mechanism 172 in a conventional manner as by effecting the energization of a solenoid valve to supply air to the pipe 175 and to direct a blast of air against the sheet to be inspected, as described above. Energization of the relay coil 248, which is a holding relay, causes normally closed contacts 248-1 thereof to close. Closing of the relay contacts 248-1 completes a holding circuit for the relays 247, 248 independently of slider 230 through normally closed contacts 211-2 of relay 211, conductor 250, now closed contacts 248-1 of relay 248, conductor 246 and relay coil 247 to the power line 215.

The energization of the relay coil 248, therefore, causes a holding circuit to be established for the relay 248 and for the relay 247 which maintains the air blast mechanism 172 in operation even though the contacts 224-1 of the relay 224 are opened upon de-energization of stepping relay 224 when switch 135 is opened by movement of the actuating member 137 beyond switch 135. Consequently, the air blast mechanism 172 is actuated to direct air against the sheet to be inspected when the switch 135 is closed by the actuating member 137 as the first sheet following the sheet to be inspected is approaching the trip cam 95.

From the above description, it will be understood that when the switch 135 is again opened to de-energize the stepping relay 224, the sliders 230 and 231 thereof will be moved from their No. 1 contacts into engagement with their No. 2 contacts. Engagement of the slider 230 with its No. 2 contact perform no function at this time, since contacts 224-1, which are in series circuit with the slider 230, are opened.

Movement of the slider 231 from engagement with its No. 1 contact breaks the circuit to the relay coil 241 for energizing solenoid coil 130 for holding the trip cam 95 and fingers 120 in their sheet bypass position. Movement of the slider 231 into engagement with its No. 2 contact completes a circuit for energizing a relay coil 255 for completing a circuit to energize the solenoid 170 and operate trip cam 95 to its active position. Energization of the relay coil 255 causes the normally open contacts 255-1 thereof to close and complete a circuit from the power line 210 to solenoid 170 through a conductor 256. As above described, the trailing end of the sheet to be inspected has been moved by the air blast mechanism 172 out of the path of movement of the fingers 120. Energization of the relay 255 is timed so that the trip cam 95 will be moved back into its operative position in time to cause the first sheet following the sheet to be inspected to be dropped onto the pile elevator 123.

The next time the switch 135 is closed by the actuating member 137, as the second sheet succeeding the sheet to be inspected approaches the trip cam 95, the stepping relay 224 will again be energized, thereby "cocking" the relay. The cocking of the relay 224 closes the contacts 224–1 thereof. The closing of the contacts 224–1 of the relay 224 performs no function at this time, since the closing of these contacts completes a circuit to the relay coils 247, 28, which are at this time energized by the holding circuit including contacts 248–1, as above described. When the switch 135 is opened by the movement of the actuating member 137, the stepping relay 224 will be de-energized, thus stepping the sliders 230 and 231 from their No. 2 contacts into engagement with their No. 3 contacts. Movement of the slider 230 from its No. 2 contact to its No. 3 contact performs no function, since the No. 3 contact of slider 230 has no electrical connection thereto but merely makes the slider 230 ineffective to energize the relay coils 247, 248.

The movement of the slider 231 from its No. 2 contact into engagement with its No. 3 contact first breaks the circuit for relay coil 255 for effecting energization of solenoid 170 for raising the stripper fingers and moving the trip cam 95 to its active position. The de-energization of the solenoid coil 170 leaves the stripper fingers 120 and the trip cam 95 in their positions for delivering sheets to the pile elevator. When the slider 231 engages its No. 3 contact, a circuit is completed to energize a relay coil 211. Energization of the relay coil 211 causes the normally closed contacts 211–1 and 211–2 thereof to open and the normally open contacts 211–3 thereof to close. Opening of the relay contacts 211–2 breaks the holding circuit for the relay coils 247 and 248. De-energization of relay coil 247 de-actuates the air blast mechanism 172 and thus stops the blast of air issuing from the nozzles 173. De-energization of the holding relay coil 248 causes the normally open contacts 248–1 thereof to return to their open position.

Opening of the contacts 211–1 of the relay coil 211 breaks the holding circuit for the relay 214. De-energization of the relay 214 opens the contacts 214–1 but this performs no function at this time since these contacts are in the circuit which was broken by opening of contacts 211–1 of relay 211. The opening of contacts 214–2 of relay 214 performs no function, at this time, since contacts 211–3 provide a holding circuit for relay 224 around contacts 214–2 and are closed prior to the opening of contacts 214–2. Thus, an energizing circuit for the relay 214 is provided which is independent of contacts 214–2.

The switch 135 will again be closed by the actuating member 137 as the third sheet succeeding the sheet selected for inspection approaches the trip cam 95 to energize the relay coil 214 through the contacts 211–3. Energization of the stepping relay 224 "cocks" the relay and closes contacts 224–1 thereof. Closing of contacts 224–1 thereof performs no function since the slider 230 is located in engagement with its No. 3 contact. When the actuating member 237 moves off the switch 135, the switch will open, causing de-energization of the relay 224 and causing the sliders 230 and 231 to move from their No. 3 contacts to their home position into engagement with their H contacts. Movement of the slider 230 from its No. 3 contact to its home position performs no electrical function. Movement of the slider 231 from its No. 3 contact to its home position breaks the circuit to the relay coil 211. De-energization of the relay coil 211 causes normally closed contacts 211–1 and 211–2 thereof to return to their normally closed positions and causes normally open contacts 211–3 thereof to return to their normally open position. This returns the circuit to exactly the same condition in which it was initially so that upon actuation of the switch 132 by the operator, the fourth sheet succeeding the sheet to be inspected may be directed to the operator's station so that the operator may inspect it. Thus, every fourth sheet may be directed to the operator's station for inspection.

Thus it can be seen that in the illustrated and preferred embodiment, a sheet is selected for inspection by depressing the control pushbutton switch 132 which conditions the switch 135 to be effective so that when the switch 135 is next momentarily closed when a sheet is approaching the pile position, the stepping relay 214 steps one step to cause the energization of solenoid 130 to raise the stripper fingers and swing the release trip cam 95 to an inactive position. The sheet which was approaching the pile position when the switch 135 was operated to step the relay will, therefore, pass the pile position and move into the reversing section of the conveyor. As the leading edge thereof reverses its direction, the point in the delivery cycle will again be reached where the switch 135 is closed to again energize the stepping relay 214. The energization of the stepping relay 214 effects the turning on of the air blast and the de-energization thereof steps the stepping relay one additional step to de-energize the solenoid 130 for operating and holding the trip cam and stripper fingers in their sheet bypass position and to energize the relay 255 to cause the energization of solenoid 170 for returning the trip cam and the stripper fingers to their position for dropping a sheet at the pile. The air blast continues until the stepping relay 214 is stepped once more to energize relay 211 for effecting a de-energization of the air blast relay 247. The next stepping of the relay 214 returns it to its "Home" position and also effects a return of the circuit to its condition wherein the pushbutton switch 132 must again be actuated before the operation of switch 135 will effect an energization of the stepping relay 214.

It will be understood that insofar as the broader aspects of the present invention are concerned, the tail of the sheet might be advanced by means other than an air blast.

It should be understood that, while the preferred embodiment of the present invention has been described in considerable detail, it is my intention to cover hereby all constructions, modifications, and arrangements which fall within the spirit and scope of the present invention and the appended claims.

Having described my invention, I claim:

1. A delivery mechanism comprising a conveyor having a delivery run moving in one direction and a reversing section at the exit end of said delivery run for reversing the direction of movement of the conveyor, spaced gripper means on the conveyor each adapted to grip a sheet and move through the delivery run to move the sheet along a sheet path to a release position at the end of the delivery run and over a pile to which sheets are to be delivered, first means at the exit end of said delivery run for causing a sheet to be delivered to said pile or to selectively bypass said pile and move through said reversing section comprising sheet guide means movable between a pile delivery position above said path and a bypass position below said path, the tail of a sheet being carried through said reversing section clearing said sheet guide means due to movement imparted to it by said gripper means at a predetermined time in the cycle of the mechanism, means for actuating said first means in timed relationship to the approach of a sheet to said pile position, and sheet advancing means adjacent the exit end of said delivery run for advancing the tail of a sheet being carried past said pile position to cause the tail portion thereof to clear said sheet guide means at an advanced time in the cycle of the mechanism.

2. A delivery mechanism comprising a conveyor having a delivery run moving in one direction and a reversing section at the exit end of said delivery run for reversing the direction of movement of the conveyor, spaced gripper means on the conveyor each adapted to grip the leading edge of a sheet and move it along a sheet path adjacent said conveyor to move a sheet through the delivery run to a release position over a pile for receiving sheets at the exit end of said delivery run and then through said reversing section, first means adjacent said delivery run positionable in different positions to respectively effect the release of a sheet at said release position and permit the carrying of a sheet past said release position and into said reversing section of said conveyor including sheet guide means having positions on opposite sides of said path for guiding a sheet to and past said pile position respectively, sheet advancing means adjacent said exit end of said conveyor for moving a sheet being carried by said conveyor past said release position and through said reversing section outwardly away from said reversing section as it moves through the latter to cause the tail of the sheet to clear said sheet guide means at an advanced time in the cycle of said mechanism.

3. A delivery mechanism comprising a conveyor having a delivery run moving in one direction and a reversing section at the exit end of said delivery run for reversing the direction of movement of the conveyor, spaced gripper means on the conveyor each adapted to grip the leading edge of a sheet and to move through the delivery run to move the sheet along a sheet path to a release position over a pile at the exit end of the delivery run, means at said release position for selectively causing the dropping of a sheet at said release position or the movement of a sheet past said release position into said reversing section comprising sheet guide means having positions above and below the path of sheet movement for respectively guiding a sheet to said pile and guiding a sheet past the release position, and means adjacent said reversing section for directing a blast of air against a sheet moving through said reversing section to move it outwardly of the reversing section.

4. A delivery mechanism comprising a conveyor having a delivery run moving in one direction and a reversing section at the exit end of said delivery run for reversing the direction of movement of the conveyor, spaced gripper means on the conveyor each adapted to grip the leading edge of a sheet and move it along a sheet path adjacent said conveyor to move a sheet through the delivery run to a release position over a pile for receiving sheets at the exit end of said delivery run and into and through said reversing section, first means adjacent said delivery run positionable in different positions to respectively effect the release of a sheet at said release position and the carrying of a sheet past said release position and into said reversing section including sheet guiding means having positions on opposite sides of the path of sheet movement in said delivery run for guiding a sheet to and past said pile position, sheet advancing means adjacent said exit end of said conveyor for moving a sheet being carried past said release position and through said reversing section of said conveyor outwardly away from said reversing section as it moves through the latter to cause the tail of the sheet to clear said sheet guide means at an advanced time in the cycle of said mechanism, control means for said first means operable in timed relation to the approach of a sheet to said release position to position said first means to cause the sheet to bypass said pile and as the following sheet approaches the release position to position said first means to effect a releasing of the following sheet at release position and to initiate the operation of said sheet-advancing means.

5. A delivery mechanism comprising a conveyor having a delivery run moving in one direction and a reversing section at the exit end of said delivery run for reversing the direction of movement of the conveyor, spaced gripper means on the conveyor each adapted to grip the leading edge of a sheet and to move through the delivery run to move the sheet along a sheet path to a release position over a pile at the exit end of the delivery run, first means at said release position positionable in different positions to respectively cause the dropping of a sheet at said release position and the movement of a sheet past said release position and into said reversing section comprising sheet guide means having positions above and below the path of sheet movement for respectively guiding a sheet to said pile and guiding a sheet past the release position, sheet advancing means adjacent said reversing section for directing a blast of air against a sheet moving through said reversing section, control means for said first means operable in timed relation to the approach of a sheet to said release position to position said first means to cause the sheet to bypass said pile and as the following sheet approaches the release position to position said first means to effect a releasing of the following sheet at the release position and to initiate the operation of said sheet advancing means.

6. A delivery mechanism comprising a conveyor having a delivery run moving in one direction and a reversing section for reversing the direction of movement of the conveyor, spaced gripper means on the conveyor each adapted to grip the leading edge of a sheet and to move through the delivery run to move the sheet along a sheet path to a release position over a pile at the exit end of said delivery run, a cam at said release position positionable between positions for respectively causing the dropping of a sheet at said release position and the movement of a sheet past said release position, sheet guide means having positions above and below the path of sheet movement for respectively guiding a sheet to said pile and guiding a sheet past the release position, and sheet advancing means adjacent said delivery run for advancing the tail of a sheet being carried past said release position to cause the tail to clear the sheet guide means at an advanced time in the operating cycle, operating means for said cam and said sheet guide means normally positioning said cam and guide means to effect a delivery of a sheet to said pile, control means for said operating means comprising switching means actuated each time a sheet approaches the release position, and circuit means conditionable to effect a movement of said cam and guide means to cause a sheet to bypass said pile on the next actuation of said switching means and on the following actuation of said switching means to effect movement of said cam and guide means to their pile delivery positions and to effect the operation of said sheet advancing means.

7. A delivery mechanism as defined in claim 6 wherein said circuit means includes a stepping switch responsive to the actuation of said switching means.

8. A delivery mechanism as defined in claim 6 wherein said conveyor includes a reversing section adjacent the exit end of said delivery run and said sheet advancing means comprises means for directing air against the sheet as it moves through the reversing section to move the sheet outwardly of the reversing section.

9. A delivery mechanism comprising a conveyor having a delivery run moving in one direction and a reversing section at the exit end of said delivery run for reversing the direction of movement of the conveyor, spaced gripper means on the conveyor each adapted to grip the leading edge of a sheet and to move through the delivery run to move the sheet along a sheet path to a release position over a pile at the exit end of said delivery run, a cam at said release position selectively positionable at respective positions for respectively causing the dropping of a sheet at said release position and the movement of a sheet past said release position into said reversing section, sheet guide fingers having positions above and below the path of sheet movement for respectively guiding a sheet to said pile and guiding a sheet past the release position, sheet advancing means adjacent said reversing section for directing a blast of air against a sheet moving through said reversing section to move the sheet outwardly of the reversing section to advance the tail portion thereof to clear said sheet guide fingers at an advanced time in the cycle of the mechanism.

10. A delivery mechanism comprising a conveyor having a delivery run moving in one direction and a reversing section at the exit end of said delivery run for reversing the direction of movement of the conveyor, spaced gripper means on the conveyor each adapted to grip a sheet and to move through the delivery run to move the sheet along a sheet path adjacent to the delivery run to a sheet release position at the exit end of said delivery run, each of said gripping means including an arm actuatable to effect a release of a sheet gripped by the gripping means, a cam adjacent the exit end of said delivery run adapted to engage and actuate said arm of each of said gripping means as the gripping means moves past the cam to effect a release of the sheet gripped thereby, means supporting said cam for rocking movement about an axis extending generally parallel to the direction of movement of said sheet-gripping means to said release position, a plurality of stripper fingers spaced transversely of said sheet path at said release position and having ends extending toward said sheets as the sheets approach said release position, means supporting said stripper fingers for movement between positions above said sheet path for guiding the sheets released at said release position to a pile position and a position below said sheet path for guiding sheets past said release position, operating means for actuating said cam and stripper fingers between their positions to selectively cause a sheet to pass said release position and the following sheet to be released at said release position, and sheet advancing means adjacent the exit end of said delivery run for advancing the tail of a sheet being carried past said release position by said gripping means to clear said fingers at an advanced time.

11. A delivery mechanism as defined in claim 10 wherein said sheet advancing means comprises means for directing a blast of air against a sheet moving through the reversing section to move the sheet outwardly of the reversing section.

12. In a delivery mechanism as defined in claim 10 wherein control means is selectively actuated each time a sheet approaches said release position and includes means for selectively effecting actuation of said operating means to move said fingers below said path in response to a first actuation of said control means and the initiation of said advancing means and the raising of said fingers in response to the next actuation of said control means by the following sheet and to a subsequent actuation of said control means for rendering said advancing means inoperative.

13. A delivery mechanism having a conveyor adapted to move sheets through a delivery run and deliver sheets through a horizontal sheet path to a pile position, said conveyor having a reversing section of the side of said pile position remote from the side of sheet approach, a rockshaft on said remote side of said pile position extending across the sheet path and parallel to the plane thereof, stripper fingers on said shaft rocked by the rocking thereof between positions above and below the sheet path to guide a sheet respectively to and past the pile position, a solenoid connected to rock said shaft, a sheet release cam adjacent said pile position having a position for causing a release of a sheet at said pile position and a position wherein the cam is ineffective to effect a release of the sheet, means supporting said cam for rotation about a horizontal axis parallel to the direaction of sheet movement to said pile position to move the cam between its said positions, a pivoted lever rockable between two positions, gear teeth on said cam, gear teeth on one end of said lever meshing with the teeth on said cam to effect a rotation of said cam between its position on the rocking of said lever, and means interconnecting said lever and shaft to rock together.

14. A delivery mechanism comprising a conveyor having a delivery run and a run disposed above said delivery run and spaced gripping means on said conveyor each adapted to grip the leading edge of a sheet and to move the sheet along the delivery run to a release position, a cam at said release position adapted to effect a release of each of said gripping means as it passes the cam to effect a dropping of the sheet, means supporting said cam comprising means supporting said cam between said runs and for rotation about an axis parallel to said delivery run at said release position, a plurality of stripper fingers spaced across the sheet path and extending toward a sheet being delivered to the release position, a rockshaft connecting said fingers and rockable to swing said fingers to move the fingers from a position above the sheet path to a position below the sheet path, gear teeth rotatable with said cam, means connecting said rockshaft to said cam to operate said cam and rockshaft simultaneously comprising a reciprocable member having gear teeth adapted to mesh with the gear teeth rotatable with said cam to rotate the latter about said axis upon reciprocation of said reciprocable member and means interconnecting said reciprocable member and said rockshaft whereby said reciprocable member is reciprocated on the rocking of said rockshaft, and means for selectively operating said rockshaft.

15. In a delivery mechanism, a conveyor means having a delivery section for moving a sheet past a release position and a reversing section into and through which a sheet moves after passing said release position for reversing the direction of movement of the sheet, means for effecting a release of the sheet at said release position and the carrying of a sheet past said release position into and through said reversing section selectively, sheet guide means at said release position having positions on opposite sides of the path of sheet movement through the delivery section of said conveyor means for respectively guiding a sheet moving past said release position and a sheet being released at said release position, the sheet guide means being disposed adjacent said reversing section whereby a sheet will overlie said guide means while at least part of the sheet is moving through said reversing section, and sheet advancing means for advancing the tail portion of a sheet being moved by said conveyor means through said reversing section to cause the tail portion of the sheet to clear the sheet guide means at a time in the cycle of the mechanism in advance of the time that the tail portion would clear the sheet guide means due to operation of the conveyor means.

16. In a delivery mechanism, the combination as defined in claim 15 wherein said sheet advancing means comprises means for directing a blast of air against a sheet being moved through said reversing section of said conveyor means to move the sheet outwardly of the reversing section.

17. A delivery mechanism comprising a conveyor having a delivery run and a run disposed above said delivery run and spaced gripping means on said conveyor each adapted to grip the leading edge of a respective sheet to move the sheet along the delivery run to a release position, a cam at said release position adapted to effect a release of each of said gripping means as it passes the cam to effect a dropping of the sheet, a rod rotatably supporting said cam between said runs for rotation about an axis parallel to said delivery run at said release position for movement between a position effective to effect a release of said gripping means and an inactive position ineffective to release said gripping means, said cam being slidable on said rod along said axis, means for rocking said cam about said axis and maintained in operative relationship with said cam as the latter is moved along said axis, and adjusting means operatively connected to said cam to shift the latter lengthwise of said rod, said means for rocking said cam comprising gear means connected to said cam to effect a rotation thereof about said axis.

18. A delivery mechanism comprising a conveyor having a delivery run and a run disposed above said delivery run and spaced gripping means on said conveyor each adapted to grip the leading edge of a respective sheet and move the sheet along the delivery run to a release position, a cam at said release position adapted to effect a release of each of said gripping means as it passes the cam to effect a dropping of the sheet, means supporting said cam between said runs for rotation about an axis parallel to said delivery run at said release position and for movement along said axis to adjust said cam for different types of sheets, and means for rocking said cam about said axis and maintained in operative relationship with said cam as it is adjusted along said axis comprising a reciprocable member having gear teeth adapted to mesh with gear teeth on said cam to rotate the latter upon reciprocation of said member, said gear teeth on said cam and reciprocable member being relatively slidable parallel to said axis.

19. A delivery mechanism comprising a conveyor having a delivery run and a run disposed above said delivery run and spaced gripping means on said conveyor each adapted to grip the leading edge of a respective sheet to move the sheet along the delivery run to a release position, a cam at said release position adapted to effect a release of each of said gripping means as it passes the cam to effect a dropping of the sheet, a support member for said cam for supporting said cam between said runs, mounting means mounting said cam on said support member for swinging movement about an axis parallel to said delivery run at the release position and supporting the cam for movement between positions in which said cam is effective and ineffective to release said gripping means, said support member and said mounting means supporting said cam for movement along said run, a movable member for effecting a swinging movement of said cam between its said positions, means operatively connecting said movable member to said cam and maintaining an operative relationship between said cam and movable member as said cam is moved along said run, and adjusting means connected to said cam and operable to move the latter along said run.

References Cited by the Examiner

UNITED STATES PATENTS

| | | | |
|---|---|---|---|
| 1,607,143 | 11/26 | White | 271—64 X |
| 1,646,529 | 10/27 | Fallot | 271—79 |
| 1,879,095 | 9/32 | Claybourn | 271—79 |
| 1,968,166 | 7/34 | Pythian et al. | 101—233 X |

FOREIGN PATENTS 497,426   12/38   Great Britain.

ROBERT B. REEVES, *Acting Primary Examiner.*
EUGENE R. CAPOZIO, ERNEST A. FALLER, JR.,
*Examiners.*